United States Patent [19]

Ferguson

[11] 3,736,413

[45] May 29, 1973

[54] PRE-CONDITIONED DIVISOR TRIAL QUOTIENT DIVIDER

[75] Inventor: David E. Ferguson, Santa Monica, Calif.

[73] Assignee: Programmatics, Inc., Los Angeles, Calif.

[22] Filed: Mar. 15, 1971

[21] Appl. No.: 123,968

[52] U.S. Cl. ....................235/156, 235/160
[51] Int. Cl. ....................G06f 7/52
[58] Field of Search ....................235/156, 159, 160, 235/164; 444/1

[56] References Cited

UNITED STATES PATENTS

| | | | |
|---|---|---|---|
| 3,234,367 | 2/1966 | Ottaway et al. | 235/156 |
| 3,578,961 | 5/1971 | Miv | 235/159 |
| 3,591,787 | 6/1971 | Freiman | 235/156 X |

OTHER PUBLICATIONS

R. I. Flores, "The Logic of Computer Arithmetic" 1963 p. 153

S. G. Blaauw, "Table Lookup Multiplication," IBM Technical Disclosure Bulletin Vol. 4 No. 11 1962 pp. 35–36.

*Primary Examiner*—Malcolm A. Morrison
*Assistant Examiner*—David H. Malzahn
*Attorney*—Fulwider, Patton, Rieber, Lee & Utecht

[57] ABSTRACT

A method and apparatus for performing division by selecting a trial quotient digit from a table derived from a consideration of only the leading digits of the dividend and divisor. The trial quotient digit is the maximum of a restricted range of possible quotient digits and is used to select a corresponding multiple of the divisor which is then tested by subtraction from the dividend. The trial quotient digit is subsequently adjusted if necessary. A basic apparatus and a computer program is also described to illustrate the implementation of the method by means of a digital computer. A table look-up procedure for obtaining the multiples of the divisor may also be used in a method of multiplication.

6 Claims, 4 Drawing Figures

Patented May 29, 1973

3,736,413

3 Sheets-Sheet 1

INVENTOR.
DAVID E. FERGUSON
BY Fulwider, Patton, Rieber Lee, and Utecht
ATTORNEYS INVENTOR.
DAVID E. FERGUSON
BY Fulwider, Patton, Rieber, Lee, and Utecht
ATTORNEYS

| LEADING DIVISOR DIGIT = 6 | |
|---|---|
| LEADING DIVIDEND DIGIT | TRIAL QUOTIENT DIGIT |
| 0 | 1 |
| 1 | 3 |
| 2 | 4 |
| 3 | 6 |
| 4 | 7 |
| 5 | 9 |
| 6 | 9 |

TABLE-1

| LEADING DIVISOR DIGIT = 7 | |
|---|---|
| LEADING DIVIDEND DIGIT | TRIAL QUOTIENT DIGIT |
| 0 | 1 |
| 1 | 2 |
| 2 | 4 |
| 3 | 5 |
| 4 | 7 |
| 5 | 8 |
| 6 | 9 |
| 7 | 9 |

TABLE-2

| LEADING DIVISOR DIGIT = 8 | |
|---|---|
| LEADING DIVIDEND DIGIT | TRIAL QUOTIENT DIGIT |
| 0 | 1 |
| 1 | 2 |
| 2 | 3 |
| 3 | 4 |
| 4 | 6 |
| 5 | 7 |
| 6 | 8 |
| 7 | 9 |
| 8 | 9 |

TABLE-3

| LEADING DIVISOR DIGIT = 9 | |
|---|---|
| LEADING DIVIDEND DIGIT | TRIAL QUOTIENT DIGIT |
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 9 |

TABLE-4

Fig. 3

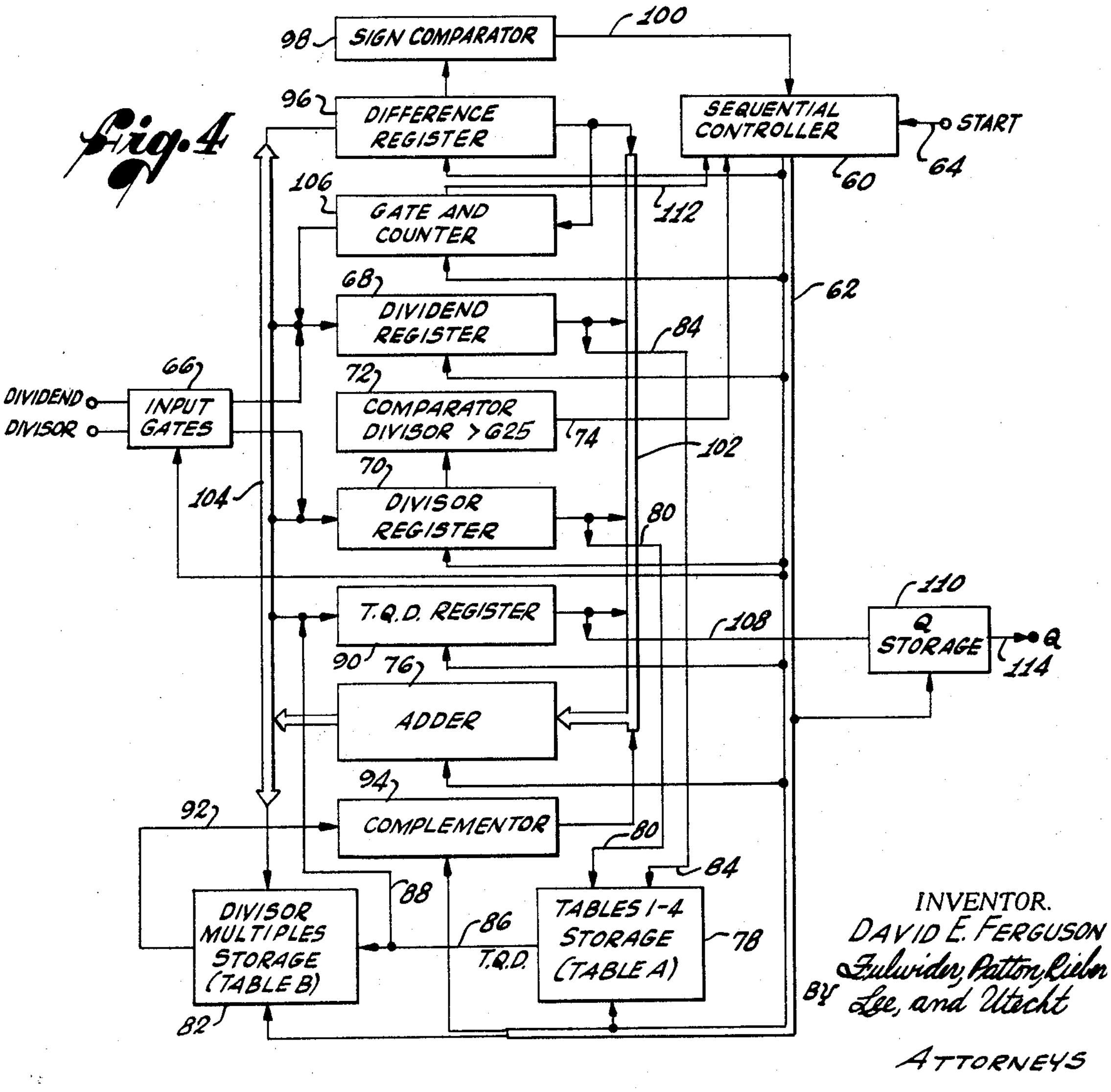

Fig. 4

INVENTOR.
DAVID E. FERGUSON
BY Fulwider, Patton, Rieber, Lee, and Utecht
ATTORNEYS

PRE-CONDITIONED DIVISOR TRIAL QUOTIENT DIVIDER

BACKGROUND OF THE INVENTION

1. Field of the Invention

The present invention relates generally to a system for performing division and, more particularly, to a method for utilizing a table look-up procedure to select the maximum of a restricted range of quotient digits which is in turn used to select the appropriate pre-computed multiple of the divisor.

2. Description of the Prior Art

In implementing the arithmetic operation of long division on a machine such as a digital computer, the simplest method to follow is to repeatedly subtract the divisor from the dividend until the result is negative. The first quotient digit is then one less than the number of subtractions performed. The divisor is then added to the result once to produce a positive remainder which then becomes the new dividend for determining the second quotient digit.

This simple method is relatively time consuming and several techniques have been devised in the past to reduce the average number of "additions" (subtraction is a form of addition in a digital computer) needed to determine a correct quotient digit. Typically, these prior techniques utilize a process known as "normalization" in which the divisor is modified so that it is above some predetermined numerical value to reduce the range of possible quotient digits. But, such prior techniques additionally require the examination of two leading digits of the dividend and one leading digit of the divisor to predict a quotient digit. These methods also assume the existence of auxilliary multiply and divide operations already existent in the computer which must be performed in the course of the long division.

If the machine in which these prior techniques are used does not have a built in divide operation, as is the case in some computers, the required auxiliary division must be programmed, resulting in a relatively slow long division process. A table look-up procedure is considered relatively impractical due to the relatively large size of the table required for the possible combinations of the two leading digits of the dividend.

SUMMARY OF THE INVENTION

The present invention provides a system for performing long division in which only a single leading digit of both the dividend and divisor need be considered in selecting a trial quotient digit. The criteria utilized in selecting the trial quotient digit are such that the correct quotient digit is within a restricted range of digits including the selected trial quotient digit. Therefore, only the selected trial quotient digit and the other digits within the restricted range need be tested to arrive at the correct quotient digit.

In performing long division by means of the system of the invention, a necessary criteria is that the divisor have a numerical value above a predetermined value. As will be developed below, the predetermined numerical value is dependent on the number base employed, and is given by the expression $v_o=(b-5)/(b-2)$ where $v_o$ is the predetermined numerical value of the divisor and $b$ is the number base.

For the illustrated and described embodiment for the base 10, the numerical value of the divisor has to be equal to or greater than 625. Thus, if the numerical value of the divisor is below this value, the dividend and divisor are "normalized", until the numerical value of the divisor is 625 or greater. The normalization is performed by successively multiplying the dividend and divisor by a common factor, preferably two, so that the dividend and divisor may be conviently added to themselves to effect the multiplication.

The process of normalizing the dividend and divisor insures that the actual quotient digit will be within two digits of a selected trial quotient digit dependent on the leading digits of the dividend and divisor. The criteria for selecting the trial quotient digit will be developed fully below.

The system of the invention may be implemented by an apparatus or by a method adapted for use in a digital computer. In either implementation, the trial quotient digits are preferably pre-computed for all values of leading digits of the dividend and divisor and the results are tabulated and stored for use in a table look-up procedure. As will be shown below, the trial quotient digits are selected in accordance with the following relationship:

$$p=\min\left\{(b-1),\ [b\,(m+1)-1]/[\overline{\max(n,bv_0)}]\right\}$$

where

- $p$ is the trial quotient digit and is equal to the minimum of the two terms within the braces,
- $b$ is the base number
- $m$ is the leading digit of the dividend
- $n$ is the leading digit of the divisor
- $v_o$ is as defined above $=(b-5)/(b-2)$, the brackets indicate that the enclosed term is to be truncated to an integer, and $\max(n,bv_o)$ indicates that the maximum of the two terms within the parentheses is to be taken.

An additional feature of the illustrated and described presently preferred embodiment is the precomputation, by successive addition, of the possible multiples of the normalized divisor. Thus, following the selection of the trial quotient digit, the corresponding multiple may be immediately obtained for subtraction from the dividend as a test for the correct quotient digit. Therefore, in implementing the system of the invention, the only arithmetic operation which is required to perform long division, is addition, subtraction being a special form of addition. The precomputation of multiples of one factor in the computation may also be advantageously employed in a system of multiplication included as a part of the present invention.

Thus, the present invention provides a computation system including a means for performing long division which allows the selection of a trial quotient digit which is, at most, only two digits from the correct quotient digit by an examination of only the leading digits of a normalized dividend and divisor to greatly decrease the time required for such division over the method of the past.

BRIEF DESCRIPTION OF THE DRAWINGS

FIG. 3 is a tabulation of the trial quotient digits for all combinations of leading digits of the dividend and the divisor for the base 10, forming TABLES 1–4 referred to in FIG. 1; and FIG. 4 is a block diagram of an apparatus for implementing the method of the invention.

DESCRIPTION OF THE PREFERRED EMBODIMENT

Figure 1:
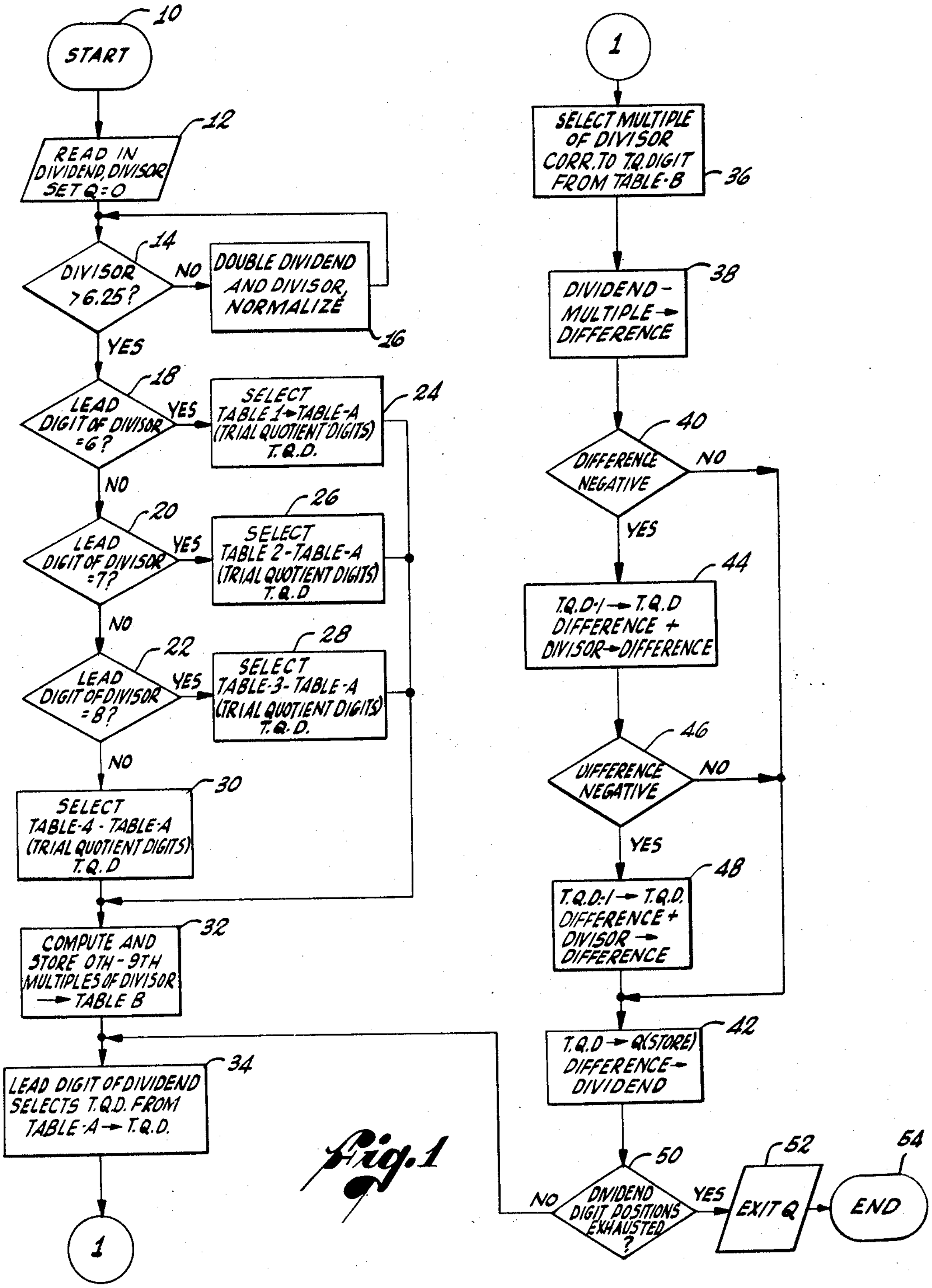
FIG. 1 is a flow diagram of the operation of a method of long division included in the system of present invention.

As was briefly described above, a principal feature of the system of long division of the present invention is the prediction, or selection, of a trial quotient digit based only on an examination of a single leading digit of a normalized dividend and divisor, treating the number base as a constant. The specification of certain criteria regarding the numerical range of the dividend and the divisor and the normalization limit of the divisor, which will be fully described below, insures that the selected trial quotient digit is the maximum of a consecutive set of only three possible quotient digits. This means that a maximum of only two subtractive tests might have to be made to arrive at the correct quotient digit.

When the trial quotient digit is selected, its corresponding multiple of the divisor is subtracted from the dividend in the usual manner. If the difference is positive, the trial quotient digit is the correct quotient digit and no further operations are necessary. If the result is negative, the trial quotient digit is known to be too high. The next lower digit is then tested by subtracting its corresponding multiple from the dividend. If the difference is still negative, it is known that the correct quotient digit must be the next lower digit. After the multiple of the divisor corresponding to the correct quotient digit is subtracted from the dividend, the remainder is then substituted for the dividend and the previous operations are repeated to obtain the next quotient digit.

While the necessary computation to determine the trial quotient digit may be made for each digit of a multidigit quotient, a great advantage of the invention is that, because only one leading digit of each of the dividend and divisor need be considered and the range of leading divisor digits is restricted by the normalization requirements, there is a relatively small number of combinations of dividend and divisor digits possible. For a number base of nominal size, such as ten, the number of digit combinations is small enough to make precomputation and tabulation practical.

When the system of the invention is preferably implemented on a digital computer, the number of combinations is small enough so that the tabulations may be permanently stored without occupying an inordinate amount of storage space. The trial quotient digits may then be selected by means of a table look-up procedure.

It will be shown below that, for a number base of 10, utilized in the illustrated presently preferred embodiment, the divisor must be normalized to a numerical value greater than 625 in order to insure that the permissible range of quotient digits is limited to only three digits. This means that the range of leading digits of the divisor is between 6 and 9. The number 10, being a two digit number, is not permitted.

It will also be shown, from the criteria developed below, that the leading digit of the dividend is restricted to being equal to or less than the leading divisor digit. Based on these ranges of leading dividend and divisor digits, the maximum trial quotient digit may be predetermined by computation, yielding TABLES 1–5 shown in FIG. 3.

Because the normalized divisor does not change in determining successive quotient digits, the preferred embodiment of the invention advantageously includes precomputation of the multiples of the normalized divisor. It should be noted that the number of multiples to be computed is dependent on and limited by the base number. The multiple corresponding to the selected trial quotient digit is then obtained by means of a table look-up procedure. The precomputed multiples may also be used to multiply a multiplicand by a multiplier by a table look-up procedure. The multiples of the multiplicand may be precomputed and corresponding multiples of the multiplier digits successively added with due regard for the digital significance of each of the multiplier digits. Preferably, the multiplier would be selected from the least significant multiplier digit first.

Returning to long division, after the multiples of the divisor have been computed, and the leading digit of the divisor determined, each trial quotient digit for the dividend and its corresponding multiple may be obtained simply by examining the leading digit of the dividend and performing two table look-up procedures. No computation at all is required, greatly increasing the speed of the long division over the prior techniques.

FIG. 1 shows a flow diagram illustrating the manner in which the long division may be implemented as an automated method in a digital computer. As the method is intended for permanent or semi-permanent incorporation within the computer, it is assumed that TABLES 1–4 of FIG. 3 are already suitably stored in memory. Thus when long division is desired, the method is started by means of start block 10 and a dividend and divisor are read into the computer by means of an input block 12. At the same time, the storage position Q is set to zero.

The divisor is tested by decision block 14 to determine whether its numerical value is greater than 625, the normalization limit for the base 10. If it is not, the dividend and divisor are both doubled in block 16, and the divisor is tested again.

When the divisor is normalized, its leading digit is examined in a series of decision blocks 18, 20 and 22 to determine whether that leading digit is 6, 7, 8 or 9, respectively. A YES decision in any of the blocks 18, 20 or 22 means that the leading digit is 6, 7 or 8 respectively while a NO decision in all those blocks means that the leading digit must be 9.

The result of the decisions in blocks 18, 20 and 22 is the selection in blocks 24, 26, 28 and 30, respectively of TABLES 1 through 4 as TABLE A from which the trial quotient digits will be selected for the entire long division process for the particular dividend and divisor.

Following the selection of the proper TABLE A, the multiples of the divisor are computed in block 32 and stored as TABLE B. The multiples are computed by successive addition and it should be noted that, since the first multiple is known, only the second through ninth multiples must actually be computed by eight successive additions.

The two tables needed for the table look-up procedures are now available and the lead digit of the dividend is examined and applied to TABLE A to select a trial quotient digit in block 34. The trial quotient digit (T.Q.D.) is then used in block 36 to select the corresponding multiple of the divisor from TABLE B.

The selected multiple is subtracted from the dividend in block 38 to produce a difference. It will be appreciated that, since the trial quotient digit is the maximum, if the difference is positive the trial quotient digit is the actual correct quotient digit and the difference must be less than the divisor.

The difference is tested in a decision block 40 to determine whether the trial quotient digit is the correct quotient digit. If the difference is positive, the trial quotient digit is correct and is transferred to the Q storage position in a block 42. If the difference is negative, the trial quotient digit is too high and is reduced, or decremented by 1 in a block 44. The divisor is also added to the difference in block 44 to produce a new difference corresponding to the decremented trial quotient digit.

The difference is then tested again in another decision block 46 and, if it is positive, the trial quotient digit is correct and is transferred to the Q storage position in block 42. If the difference is still negative, it is known that the correct quotient digit is one less than the present trial quotient digit because the original trial quotient digit can never be more than two digits away from the correct quotient digit. Therefore, the trial quotient digit is decremented a final time and the divisor again added to the difference in a block 48. The correct quotient digit is then transferred to the Q storage position in block 42.

The remaining difference then becomes the new dividend in block 42 and it is determined whether to repeat the process. This decision can be made in accordance with various criteria such as whether a quotient digit has been determined for each dividend digit position. This is the criteria used in the illustrated decision block 50. Therefore, if the dividend digit positions are exhausted, the long division process is terminated. The quotient digits stored in the Q storage position are then exited trough an output block 52 and an end block 54.

If the dividend digit positions are not exhausted, the process returns to block 34 and the leading digit of the new dividend again selects a new trial quotient digit from TABLE A and the process is repeated to generate another quotient digit to be stored in the Q storage position.

It should be appreciated that, if the dividend is not an exact multiple of the divisor, terminating the long division process after the dividend digit positions are exhausted leaves a remainder which is the new dividend produced by block 42. This remainder could be either ignored or exited along with Q. Alternatively, some other criteria could be used to terminate the process, such as ending the division after a predetermined number of quotient digits have been produced.

Figure 2:
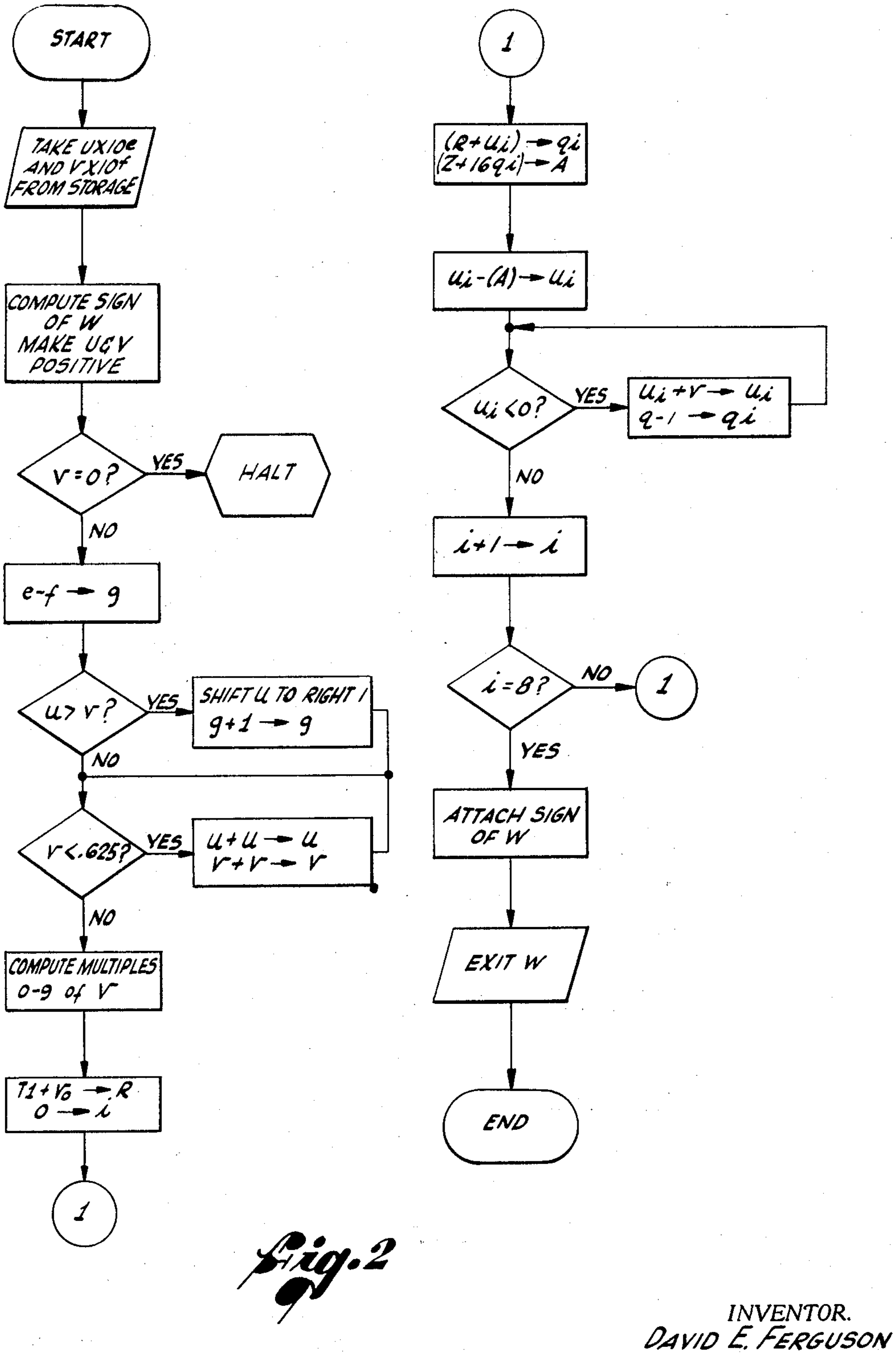
FIG. 2 is a flow chart of a program for implementing the method included in the invention by means of a digital computer.

While FIG. 1 illustrates the sequential progression of steps for a general implementation of the method of the invention in a digital computer, the actual detailed steps of the implementation depend upon the program language used and its capabilities. An actual program flow chart for implementing the method of the invention is shown in FIG. 2 for the International Business Machines System 3 Assembly Language. A program listing for this particular program appears in the Appendix.

The program illustrated by FIG. 3 is for a floating point division having a general form, $$(u \times 10^e)/(v \times 10^f) = w \times 10^g$$

It is assumed that the first digit of each of $u$, $v$ and $w$ are non-zero unless, of course, the entire number is zero. The term $u_i$ represents the $i$th digit of the dividend $u$ and $q_i$ represents the $i$-th digit of the quotient $q$.

T1 is the address of the precomputed trial quotient digit table for a first dividend digit of 6. Z represents the address of the "zero" multiple of the divisor $v$ and is exactly equal to zero.

The system of the invention may also be implemented by an apparatus permanently connected within the computer to perform the operational steps of the method on command. Such an apparatus is shown in FIG. 4. FIG. 4 is a block diagram of the interconnection according to the system of the invention of well known functional elements which may be found in a typical digital computer. The illustrated apparatus is operated by a sequential controller 60 which supplies time sequenced control signals which are connected to the various other elements of the apparatus over a control signal bus 62 employing a technique well known in the art.

In accordance with the invention, the controller first responds to a start command over a line 64 to send a dividend and divisor through input gates 66 to a dividend register 68 and a divisor register 70, respectively. A comparator 72 then determines whether the divisor is greater than a numerical value of 625 and sends an appropriate signal over line 74 to the controller 60 to successively add the dividend and divisor to themselves, if necessary, by means of an adder 76 and return the sums to the dividend and divisor registers 68, 70, respectively.

The controller 60 then activates the TABLE A storage section 78 so that the leading digit of the divisor, connected to the section through a line 80, selects one of TABLES 1–4 from FIG. 3 as TABLE A. The controller 60 then operates the divisor register 70, the adder 76 and a divisor multiples storage section 82 to compute, by successive addition, the multiples of the divisor and store them in the section 82 as TABLE B. The controller 60 then connects the leading digit of the dividend over a line 84 to TABLE A storage section 78 to select a trial quotient digit (T.Q.D.) which, in turn, is connected over a line 86 to the TABLE B storage section 82 to select the corresponding multiple of the divisor. The trial quotient digit is also sent over a line 88 to a T.Q.D. register 90.

The controller 60 then operates the TABLE B storage section 82 to send the selected multiple of the divisor over a line 92 through a complementor 94 to the adder 76 to be added to the dividend from the dividend register 68 which, in effect, is a subtraction of the multiple of the divisor from the dividend. The difference is sent to a difference register 96 and a sign comparator 98 determines whether the difference is positive or negative. If negative, the sign comparator 98 sends a signal over a line 100 to the controller 60 which then subtracts 1 from the T.Q.D. register 90 and adds the divisor to the difference, both operations being effected through the adder 76. It should be appreciated that the transfers to and from the adder 76 are accomplished by means of common input and output busses 102, 104, respectively, for the adder.

The subtraction of 1 from the T.Q.D. register 90 addition of the divisor to the difference is done one more time, at most, until the difference in the register 96 is positive. The difference is then transferred through the gate and counter 106 to the dividend register 68 as the new dividend. At the same time, the quotient digit in the T.Q.D. register 90 is transferred over a line 108 to a Q storage section 110.

The division process then continues with new dividend until the count in the gate and counter 106 indicates that the process is complete in accordance with the criteria discussed above. A signal is then sent over a line 112 to the controller 60 to terminate the process and send the accumulated quotient Q out over a line 114.

While a particular apparatus has been described, it should be appreciated that many design variations and modifications are possible. Therefore, the apparatus shown in FIG. 4 is intended to only illustrate the interconnection of basic apparatus elements according to the system of the invention.

As was briefly discussed above, the advantages of the present invention, including selecting a trial quotient digit within two digits of the correct quotient digit by considering only a single leading digit of the dividend and divisor, are based on certain basic criteria. These basic criteria are that the numerical value of the dividend be equal to or less than the numerical value of the divisor and that the numerical value of the divisor be normalized to a predetermined value dependent on the number base employed. The mathematical basis for these criteria is developed below.

In considering the division of any general number $x$ by any other general number $y$, except zero, the quotient can be represented in "floating point" form in which any number is represented as being equal to or greater than zero but less than 1 and the decimal point is determined by an appropriate power of the base number $b$. The signs of the numbers may be ignored for the purpose of the following discussion.

Thus, we have $$x/y = (u/v)b^e$$

Establishing the first criteria on this basis, we have the following restrictions, $$0 \leq u < v < 1 \leq bv$$

It can be seen that the restriction on $u$ that it be less than $v$ can be accomplished by a suitable shift in the decimal point of u with a corresponding change in the exponent $e$. It can also be seen that $v$ necessarily cannot have a "0" as a first digit.

The division method under consideration is based only on a consideration of $u$ and $v$ so that the exponent $e$ is used only to place the decimal point of the final quotient.

A generalized quotient w may then be defined as, $$w = u/v$$

and, since the method of the invention involves a consideration of the leading digits of the dividend and divisor, the leading digits of the above quantities are defined as, $$m = [bu],\ n = [bv],\ q = [bw],$$

where the brackets indicate that the contained term is truncated to an integer.

The following development is to determine the proper relationship between the dividend $u$, the divisor $v$, and their leading digits $m$ and $n$, respectively, so that the leading digit $q$ of the quotient $w$ lies within the restricted range, $$p-2 \leq q \leq p,$$

where $p$ is defined as the maximum quotient digit.

It can be seen that the relationship between the maximum and minimum numerical values of the dividend $u$ and the divisor $v$ and their leading digits $m$ and $n$, respectively, are such that, $$bm \leq b^2u < b\ (m+1)$$

and $$n \leq bv < n+1.$$

In terms of the above ranges for the dividend and divisor, the range of possible leading quotient digits $q$ can be expressed as, $$[(bm)/(n+1)] \leq q \leq [b\ (m+1)]/n$$

Considering the upper limit of $q$, it can be shown that if $b\ (m+1)$ is not an exact multiple of $n$, $q$ will be the same for both $b\ (m+1)$ and $b\ (m+1)-1$. Also, if $b\ (m+1)$ is an exact multiple of $v$, it can be shown that the truncated quantity is too large an upper bound. Therefore, expression for the upper bound can be reduced and the range of $q$ becomes, $$[(bm)/(n+1)] \leq q \leq [b\ (m+1)-1]/n.$$

Due to the restrictions placed on $m$, $n$ and $q$, $q$ cannot be greater than the numerical value $b-1$ so that the actual upper limit is $b-1$ or the upper limit expression given above, whichever is least. The actual upper limit is defined as $p$, the maximum quotient digit, and is given by the expression, $$p = \min\left\{(b-1),\ [b\ (m+1)-1]/n\right\}$$

in which $p$ is defined as being the lesser of the two quantities within the braces. The range of $q$ may then be rewritten as, $$[(bm)/(n+1)] \leq q \leq p \leq b-1$$

Next, it will be shown that by normalizing the divisor $v$ so that its leading digit is greater than $b-4$ ($n > b-4$), and specifying that the base be equal to or greater than 8 ($b \geq 8$), that the range of the quotient digit $q$ becomes, $$p-2 \leq q \leq p,$$

restricting $q$ to a range of three digits only.

This can be shown by initially assuming that $q$ does deviate from the maximum $p$ by more than two digits, that is, $$q < p-2.$$

In terms of the range of $q$ stated above, this is the equivalent of stating that the lower limit of $q$ is equal to or less than $p-3$, or, $$[(bm)/(n+1)] \leq p-3$$

Then assume an upper limit of $q$ outside the stated permissible range, that is, $$[b\ (m+1)\ -1]/n \leq b-1,$$

which necessarily means that the dividend of the above expression is at least $b$ times the divisor, or, $$b\,(m+1)-1 \geq bn,$$

but, since $m$ $n$, the above expression can only be true for $m=n$. Also, it can be seen that, for this case $p$ must be its maximum $b-1$. Therefore, from the above, $$p=b-1 \geq [(bm)/(n+1)]+3$$

and substituting $m=n$ and expanding, $$p \geq ([b(n+1)-b]/(n+1)]+3,$$

and removing exact multiples of $n+1$ from the brackets, the expression reduces to, $$p \geq b+3+[-b/(n+1)].$$

Making use of the identity, $$[-i/j] = -[(i+j-1)j]$$

the above expression reduces to, $$b-1 \geq b+3-[(b+n)/(n+1)]$$

requiring that, $$b+n \geq 4n+4$$

or $$3n \leq b-4$$

which means that, if the upper limit of $q$ is greater than $b-1$, the expression for the lower limit, $$[(bm)/(n+1)] \leq p-3$$

is impossible if $n \geqq b-4$.

Therefore, the upper limit must be $b-1$ or less so that the range of the terms can be expressed as, $$b-1 \geq [b(m+1)-1]/m=p \geq [(bm)/(n+1)]+3 \geq m+3.$$

Expanding the term for the maximum, $$[(bm+1)-1]/n=m+1+[(b-n)\,(m+1)-1]/n \geq m+3$$

From this, it can be seen that, $$(b-n)\,(m+1)-1 \geq 2n.$$

Considering the first and last terms of the range expressed above, it can be seen that, $$m \leq b-4,$$

and substituting $m=b-4$, for simplification, the immediately above expression becomes, $$(b-n)\,(b-3)-1 \geq 2n,$$

resulting in, $$n \leq b-3.$$

Therefore, since the previous assumption was made that $n>b-4$, this can only be satisfied for $n=b-3$.

Considering for a moment the lower limit of $q$, $[(bm)/(n+1)]$, note that, unless the next larger dividend $10m+1$ is an exact multiple of the divisor, $n+1$, that, $$[(bm)/(n+1)] = [(bm+1)/(n+1)].$$

But if $n=b-3$, it can be seen that $bm+1$ is odd while $n+1$ is even so that $n+1$ cannot be an exact multiple of $bm+1$.

Therefore, the new lower limit can be introduced into the range of terms which becomes, $$[b(m+1)-1]/n \geq [(bm+1)/(n+1)]+3 \geq m+3.$$

Substituting $n=b-3$ and considering the two outside terms, it can be seen that, $$b(m+1)-1 \geq (m+3)\,(b-3)$$

or $$3m \geq 2b-8.$$

It can be seen that, if $n=b-3$, $$[(bm+1)/(b-2)] = m+[(2m+1)/(b-2)]$$

and subtracting the above limitation, $$m+[(2m+1)/(b-2] \geq m+[(2b-m-7)/(b-2)]$$

and if $$[(bm+1)/(n+1)]+3=m+3,$$

then $$m+[(2b-m-7)/b-2] \leq m,$$

and $2b-m-7$ necessarily must be less than $b-2$, or, $$2b-m-7<b-2$$

resulting in, $$b-4 \leq m.$$

But, from above, it was determined that $m \leq b-4$ so that, by necessity, $$m=b-4.$$

Substituting $n=b-3$ and $m=b-4$ into the expression for the range of $q$ leaves, $$[b(m+1)-1]/n \geq [(bm)/(n+1)]+3,$$

and $$[(b^2-3b-1)/(b-3)] =b-1 \geq [(b^2-4b)/(b-2)]+3,$$

if $b \geq 8$.

Therefore, if $>b-4$, $$p-2 \leq q \leq p.$$

While this proves that the range of $q$ is so restricted if $n>b-4$, there are values of $v$ for which $n=b-4$ where the range also holds in a certain range of base numbers $(9 \leq b \leq 13)$. The limitations of these values can be determined as follows by assuming that $n=b-4$ and the $p$ falls outside the desired range, that is $q \leq p-3$.

It can be assumed that, if $n=b-4$, $$m \geq n-1=b-5,$$

and, substituting into the maximum term, $$[b(m+1)-1]/n \geq [(bn-1)/n]=b-1$$

Therefore, based on the two assumptions, $$m \geq b-5,$$

and $$q \leq p-3,$$

and substituting in the expression for the range of $q$ from above, $$p=b-1 \geq [(bm)/(n+1)]+3$$
$$\geqslant [(bn-b)/(n+1)]+3=[(b^2-5b)/(b-3)]+3=b,$$

unless $b \leq 8$, so that it can be seen that if $b \geq 9$, $m \leq b-6$.

But consider the range developed above, $$[b(m+1)-1]/n \geq [(bm)/(n+1)]+3 \geq m+3,$$

and substitute for $n$ to get, $$[b(m+1)-1]/(b-4) \geq [(bm)/(b-3)]+3 \geq m+3.$$

Considering the outer limits, it can be seen that, $$b(m+1)-1 \geq (m+3)(b-4),$$

or $$4m>2b-11.$$

It can also be seen that, $$[(bm)/(b-3)]=m+[(3m)/(b-3)],$$

and substituting the above limitation, this reduces to, $$[(bm)/(b-3)]=m+[(3m)/(b-3)] \geq m+[(2b-m-11)/(b-3)].$$

Therefore, either $2b-m-11<b-3$ which results in $m \geqslant b-7$, or, $$[(bm)/(b-3)]>m,$$

which results in, $$[b(m+1)-1]/(b-4) \geq m+4,$$

and, $$b(m+1)-1 \geq (m+4)(b-4),$$

so that, $$4m \geq 3b-15.$$

However, if $m<b-7$, then, $$4(b-8) \geq 4m \geq 3b-15,$$

resulting in, $$b \geq 17.$$

Thus, it can be seen that, $$b-7 \leq m \leq b-6.$$

Finally, if $m=b-7$, it can be seen that $b-3$ cannot be an exact multiple of $bm+1$ unless $b=14$. Therefore, expanding on the lower limit, $$b-1 \geq p \geqslant [(bm)/(n+1)]+3=[(bm+1)/(n+1)]+3=[(b^2-7b+1)/(b-3)]+3.$$

But it should be noted that, $$[(b^2-7b+1)/(b-3)]+3=b$$

if $b>8$.

Selecting $p$ in accordance with the above method will guarantee that the quotient digit $q$ will be within two digits of $p$ if $n \geq b-4$ except for the case of $n=b-4$ and $m=b-6$. In that case $v$ can be as small as $b^{-1}n$ while $u$ can be as large as $b^{-1}(m+1)$. This permits $q$ to be as large as $b-2$. However, if $v_o$ is required to be somewhat larger than $b^{-1}n$, then $q$ can be prevented from reaching $b-2$. Therefore, since $m+1>bu$, if a specific value $v_o$ of divisor is chosen so that it satisfies the expression, $$b-2=(m+1)/v_o > (bu)/v_o \geq [(bu)/v_o]=q,$$

then $q<b-3$.

The specific value of divisor $v_o$ can then be defined as, $$v_o=(m+1)/(b-2)=(b-5)/(b-2)$$

For the present by preferred embodiment described above, the number base is 10 so the specific value of divisor is, $$v_o=5/8=.625.$$

The divisor is then normalized to a numerical value of 625 to insure that the quotient digit $q$ is within two digits of the maximum quotient digit $p$ which is consequently defined as, $$p=\min\left\{(b-1), [b(m+1)-1]/[\max(n,bv_o)]\right\}.$$

The above expression for $p$ is then used in the method of the invention to precompute TABLES 1–4 shown in FIG. 3 for the number base 10.

Thus, the utilization of the above criteria results in a long division method which allows the selection of a trial quotient digit which is within two digits of the correct quotient digit by an examination of only single leading digits of a normalized dividend and divisor. The method of the invention then greatly decreases the time required for long division.

While a particular presently preferred embodiment of the system of the invention in the form of a method implemented by a computer program and a basic apparatus have been described in detail, it should be appreciated that the system of the invention can be implemented in numerous other ways. Therefore, the scope of the invention is not to be limited except by the claims.

APPENDIX

```
STMT SOURCE STATEMENT                    VER 01, MOD 00

   1 FLTPNT START X'1000'
   2 *
   3 *        DEFINITIONS
   4 *
   5 A        EQU    8                   ADDRESS RECALL REGISTER
   6 B        EQU    1                   BASE REGISTER
   7 X        EQU    2                   INDEX REGISTER
   8 I        EQU    5                   LENGTH OF INTEGER
   9 R        EQU    8                   LENGTH OF REAL MANTISSA
  10 E        EQU    2                   LENGTH OF REAL EXPONENT
  11 F        EQU    R+E                 FLOATING POINT LENGTH
  12 PLUS     EQU    X'F0'               ZONED PLUS
  13 MINUS    EQU    X'D0'               ZONED MINUS
  14 ZERO     EQU    X'F0'               ZONED DIGIT 0
  15 ONE      EQU    X'F1'               ZONED DIGIT 1
```

```
STMT SOURCE STATEMENT          VER 01, MOD 00

 17 *                                 D  A  T  A    S  T  O  R  A  G  E    M  A  P
 18 BASE     EQU    *                /-----------------------------------------------/
 19 D1       EQU    *                /  '  '  '  /    /            0          /0 /
 20          DC     DL8'11110000'    /  '  '  '  /    /                       /  /
 21 D0       EQU    *                /  '  '  '  /    +--+--------------------+--/
 22          DC     DL8'0'           /6 '7 '8 '9 /    /0 /        REAL        /0 /
 23          DC     DL8'32220000'    /  '  '  '  /    /  /                    /  /
 24          DC     DL7'0'           /           /    +--+--------------------+--/
 25          ORG    *-R              /   TRAIL   /    /       MULTIPLE        /  /
 26 REAL     DS     DL R             / QUOTIENT  /    /        2*REAL         /  /
 27          DC     DL1'0'           /  DIGITS   /    +-----------------------+  /
 28          DC     DL8'44330000'    /    FOR    /    /       MULTIPLE        /  /
 29          DC     DL8'0'           /  LEADING  /    /        3*REAL         /  /
 30          DC     DL8'65440000'    /  DIVISOR  /    +-----------------------+  /
 31          DC     DL8'0'           /   DIGIT   /    /       MULTIPLE        /  /
 32          DC     DL8'77650000'    /   GIVEN   /    /        4*REAL         /  /
 33          DC     DL8'0'           /   ABOVE   /  0 +-----------------------+  /
 34          DC     DL8'98760000'    /           /    /       MULTIPLE        /  /
 35          DC     DL8'0'           /  '  '  '  /    /        5*REAL         /  /
 36          DC     DL8'99870000'    /  '  '  '  /    +-----------------------+0 /
 37          DC     DL8'0'           /  '  '  '  /    /       MULTIPLE        /  /
 38 SIGN     DC     DL1'0'           /  '  '  '  /    /        6*REAL         /  /
 39          DC     DL7'9980000'     /--+  '  '  /    +-----------------------+  /
 40          DC     DL8'0'           /SI/  '  '  /    /       MULTIPLE        /  /
 41 BM1      DC     IL2'-1'          /GN/  '  '  /    /        7*REAL         /  /
 42          DC     DL6'990000'      /--+--+  '  /    +-----------------------+  /
 43 NTGR1    DC     DL8'0'           / BM1 /  '  /    /       MULTIPLE        /  /
 44 DMIN     DC     DL3'625'         /     /  '  /    /        8*REAL         /  /
 45          DC     DL5'90000'       /-----+--+  /    +-----------------------+  /
 46 NTGR2    DC     DL8'0'           / DMIN  /   /    /       MULTIPLE        /  /
 47          DC     DL8'0'           /       /   /    /        9*REAL         /  /
 48          DC     DL8'0'           /-------+---+----+------+----------------+--/
 49          ORG    *-16             /           0           /       RACC        /
 50          DS     DL R             /                       /                   /
 51 RACC     DS     DL R             /-----------------------+--+----------------/
 52 TEMP     DS     DL R             /          TEMP         /  /   IACC    / ER /
 53          DC     DL1'0'           /                       /  /           /    /
 54 IACC     DC     DL I '0'         /------------+--+-------+--+------+----+--+-----/
 55 ER       DC     AL1 PLUS+R       /    EMIN    /0 /AEXP  /  ERM1  / EI  /A1/ B10 /
 56          DC     DL5'-99999'      /            /  /      /        /     /  /     /
 57          ORG    *-E              /------------+--+------+--------+-----+--+-----/
 58 EMIN     DS     DL E             /          DVSR          /                     /
 59          DC     DL1'0'           /                        /                     /
 60 AEXP     DC     DL E '0'         /------------------------+                     /
 61          DC     DL E '0'         /                                              /
 62          DC     AL1 PLUS+R-1     /                                              /
 63          ORG    *-E-1            /                                              /
 64 ERM1     DS     DL E+1           /                                              /
 65          DC     DL E-1 '0'       /                                              /
 66          DC     AL1 PLUS+I       /----------------------------------------------/
 67          ORG    *-E
 68 EI       DS     DL E
 69 A1       DC     AL1 BASE-RACC+R-17
 70 B10      DC     IL2'10'
 71 DVSR     DS     DL F
 72          ORG    *,256
 74          USING  BASE,B
 75 *
 76 *        FDVD   RACC / ARG TO RACC
 77 *
 78 FDVD     ST     NORMX+3,A                  SAVE RETURN
 79          B      FSIGN                      GET DIVISOR AND QUOTIENT SIGN
 80          JNZ    FDVD9                      JUMP UNLESS DIVISOR 0
 81          HPL    X'6C',X'73'                DISPLAY 'DC'
 82          B      UNFLO                      SUBSTITUTE MAXIMUM REAL
 83 FDVD9    ZAZ    RACC+R+1 R+1,B ,D0 ,B      INSERT TRAILING 0'S
 84          SZ     AEXP ,B ,F-1 E,X           EXPONENT OF QUOTIENT
 85          CLC    RACC ,B ,REAL ,B           TEST FOR DIVIDEND LESS
 86          JL     FDVD7                      JUMP UNLESS DIVIDEND GREATER
 87          ZAZ    RACC+1 R+1,B ,RACC ,B      DIVIDE DIVIDEND BY 10
 88          AZ     AEXP ,B ,D1 ,B             INCREMENT EXPONENT OF QUOTIENT
 89 FDVD7    JOZ    FMPY1                      JUMP IF OVERFLOW/UNDERFLOW
 90 FDVD1    CLC    DMIN ,B ,REAL-R+3 ,B       TEST DIVISOR LESS THAN 6.25
```

```
STMT SOURCE STATEMENT            VER 01, MOD 00

  91            JNH    FDVD2                                   JUMP IF DIVISOR NOT LESS
  92            AZ     RACC+1 R+2,B ,RACC+1 R+1,B              DOUBLE DIVIDEND
  93            AZ     REAL+1 R+1,B ,REAL+1 R+1,B              DOUBLE DIVISOR
  94            BNOZ   FDVD1                                   BRANCH UNLESS OVERFLOW
  95            ZAZ    RACC+1 R+2,B ,RACC R+1,B                DIVIDE DIVIDEND BY10
  96            ZAZ    REAL+1 R,B ,REAL R,B                    DIVIDE DIVISOR BY 10
  97            MVI    REAL-R+1 ,B ,ONE                        INSERT LEADING 1
  98            B      FDVD1                                   REPEAT TEST
  99 FDVD2      B      FMULT                                   GET MULTIPLES OF QUOTIENT
 100            MVI    FDVD3+3,PLUS+10                         0 - 6
 101            ALC    FDVD3+3 1 ,REAL-R+1 ,B                  ADDRESS QUOTION DIGIT TABLE
 102            LA     BASE ,B ,X                              ADDRESS DIVIDEND AND QUOTIENT
 103            USING  BASE,X                                  TEMPORARY USING REGISTER
 104 FDVD6      MZN    FDVD3+3,RACC-R+1 ,X                     NEXT DIVIDEND DIGIT
 105 FDVD3      MVC    RACC-2*R+1 1,X ,BASE ,B                 NEXT QUOTIENT TRIAL DIGIT
 106            MZN    FDVD8+3,RACC-2*R+1 ,X                   ADDRESS CORRESPONDING MULTIPLE
 107 FDVD8      SZ     RACC+2 R+2,X ,REAL-15 R+2,B             SUBTRACT MULTIPLE
 108            JNM    FDVD4                                   JUMP IF CORRECT
 109 FDVD5      SZ     RACC-2*R+1 1,X ,D1 ,B                   DECREMENT QUOTIENT DIGIT
 110            AZ     RACC+2 R+2,X ,REAL+1 R+1,B              ADD DIVISOR TO DIVIDEND
 111            BM     FDVD5                                   BRANCH UNLESS NOW CORRECT
 112 FDVD4      LA     1 ,X ,X                                 INCREMENT TO ADDRESS NEXT DIGTS
 113            CLI    BM1-R-1 ,X ,X'FF'                       TEST FOR QUOTIENT COMPLETE
 114            BNE    FDVD6                                   BRANCH TO GET NEXT DIGIT
 115            DROP   X                                       END OF TEMPORARY USE
 116            MVI    REAL+1 ,B ,ZERO                         CLEAR TRAILING DIGIT
 117            J      FMPY3                                   INSERT QUOTIENT SIGN
 118 *
 119 *           RACC  *  ARG  TO  RACC
 120 *
 121 FMPY       ST     NORMX+3,A                               SAVE RETURN
 122            AZ     AEXP ,B ,F-1 E,X                        EXPONENT TO  OF PRODUCT
 123            JOZ    FMPY1                                   JUMP IF OVERFLOW/UNDERFLOW
 124            B      FSIGN                                   GET MULTIPLIER AND PRODUCT SGN
 125            B      FMULT                                   GET MULTIPLES OF MULTIPLIER
 126            ZAZ    TEMP 2*R,B ,RACC ,B                     CLEAR ACCUMULATOR
 127            LA     BASE ,B ,X                              START LOCATION
 128            USING  BASE,X
 129 FMPY2      MZN    FMPY5+3,TEMP ,X                         DIGIT OF MULTIPLIER
 130 FMPY5      AZ     RACC R+1,X ,REAL-16 R+1,B               ADD MULTIPLE OF MULTIPLICAND
 131            A      BM1 ,B ,X                               DECREMENT LOCATION
 132            CLI    BM1+R ,X ,X'FF'                         TEST FOR COMPLETION
 133            BNE    FMPY2                                   CONTINUE
 134            DROP   X
 135            CLI    RACC-2*R+1 ,B ,ZERO                     TEST FOR PRODUCT NORMALIZED
 136            JNE    FMPY3                                   JUMP IF NORMALIZED
 137            ZAZ    RACC 2*R-1,B ,RACC-R+1 ,B               NORMALIZE IN ACCUMULATOR
 138            SZ     AEXP ,B ,D1 ,B                          INCREMENT EXPONENT
 139            JNOZ   FMPY4                                   JUMP UNLESS OVERFLOW
 140            B      UNFLO                                   REAL UNDERFLOW
 141 FMPY3      ZAZ    RACC 2*R,B ,RACC-R ,B                   MOVE TO ACCUMULATOR
 142 FMPY4      MZZ    RACC ,B ,SIGN ,B                        INSERT SIGN OF PRODUCT
 143            B      NORMX                                   EXIT FMPY/FDVD
 144 FMPY1      JNM    ROVFLO                                  BRANCH IF OVERFLOW
 145            B      UNFLO                                   SET RESULT TO 0
 146 *          FSIGN  GET SIGN OF A*B AND A/B  MOVE 2ND OPERAND TO  REAL
 147 FSIGN      ST     FSIGNX+3,A                              SAVE RETURN
 148            MVC    SIGN ,B ,R-1 ,X                         SIGN OF  ARG
 149            ALC    SIGN ,B ,RACC ,B                        PLUS SIGN OF  RACC
 150            SBN    SIGN ,B ,MINUS                          EQUALS SIGN OF RESULT
 151            SBN    RACC ,B ,PLUS                           SET 1ST OPERAND PLUS
 152            ZAZ    REAL ,B ,R-1 R,X                        GET 2ND OPERAND
 153            SBN    REAL ,B ,PLUS                           SET 2ND OPERAND PLUS
 154 FSIGNX     B      0                                       EXIT
 155 *          FMULT  GET MULTIPLES 2 THOUGH 9 OF MULTIPLIER/DIVISOR
 156 FMULT      ST     FMULTX+3,A                              SAVE RETURN
 157            LA     BASE ,B ,X                              LOCATION OF 1ST MULTIPLE
 158            USING  BASE,X                                  TEMPORARY USING REGISTER
 159 FMULT1     ZAZ    REAL+17 R+2,X ,REAL+1 R+1,B             2ND OPENAND TO NEXT MULTIPLE
 160            AZ     REAL+17 R+2,X ,REAL+1 R+2,X             COMPUTE NEXT MULTIPLE
 161            LA     16 ,X ,X                                LOCATION OF NEXT MULTIPLE
 162            CLI    BM1-128 ,X ,X'FF'                       TEST FOR 9TH MULTIPLE DONE
 163            BNE    FMULT1                                  CONTINUE
```

```
STMT SOURCE STATEMENT            VER 01, MOD 00

164 FMULTX B      0                                 EXIT
165 *
166 *      FSUB   RACC  -  ARG  TO  RACC
167 *
168 FSUB   ST     FSUBX+3,A                         SAVE RETURN
169        SLC    R-1 1,X ,DO ,B                    CHANGE SIGN
170        SBN    R-1 ,X ,MINUS                     OF ARGUMENT
171        B      FADD                              AND ADD
172        SLC    R-1 1,X ,DO ,B                    RESTORE SIGN
173        SBN    R-1 ,X ,MINUS                     OF ARGUMENT
174 FSUBX  B      0                                 EXIT
175 *
176 *      FADD   RACC  +  ARG  TO  ARG
177 *
178 FADD   ST     NORMX+3,A                         SAVE RETURN
179        SZ     AEXP E+1,B ,F-1 E,X               DETERMINE LARGER OPERAND
180        JP     FADD1                             AUGEND IO LARGER
181        JZ     FADD2                             THEY ARE EQUAL, NOT ALIGNMENT
182        AZ     AEXP E+1,B ,ERM1 ,B               ADD R-1 TO EXPONENT DIFFERENCE
183        JNM    FADD3                             ALIGN RACC UNLESS MINUS
184        ZAZ    RACC ,B ,R-1 R,X                  AUGEND IS INSUFNIFICANT
185        J      FADD4                             GET EXPONENT OF ADDEND
```

I claim:

1. Apparatus for dividing a dividend by a divisor to produce a quotient, comprising:

means for restricting the numerical values of the dividend and the divisor such that the dividend is equal to or less than the divisor and the divisor has a non-zero leading digit;

means for normalizing the dividend and the divisor so that the numerical value of the divisor is greater than a predetermined numerical value $v_o=(b-5)/(b-2)$ where $b$ is the base number;

means for determining a trial quotient digit $p$ in accordance with the relationship, $$p=\min\left\{(b-1),\ [b(m+1)-1]/[\max(n,bv_o)]\right\}$$

where $p$ is equal to the minimum of the two terms within the braces, $b$ is the base number, $m$ is the leading digit of the dividend, $n$ is the leading digit of the divisor, the brackets indicate that the contained term is to be truncated to an integer, and, $\max(n,bv_o)$ indicates that the maximum of the two terms within the parentheses is to be taken;

means for generating the multiple of the divisor corresponding to the determined trial quotient digit;

means for subtracting the generated multiple of the divisor from the dividend to produce a difference;

means for outputting the trial quotient digit as a correct quotient digit if the difference is positive, and;

means for successively adding the divisor to the difference if the difference is negative, until the remaining difference is positive, and decrementing the trial quotient digit by one for each successive addition, the decremented trial quotient digit being outputted by the means for outputting as a correct quotient digit.

2. The apparatus defined in claim 1, including:

means for substituting the positive remaining difference for the normalized dividend and repeating the division until a predetermined number of quotient digits is obtained.

3. The apparatus defined in claim 1, including:

means for storing predetermined values of trial quotient digits whereby a trial quotient digit for a particular combination of leading digits of the dividend and divisor, respectively, may be generated by a table look-up procedure.

4. The apparatus defined in claim 1, wherein said means for generating the multiple of the divisor includes:

means for precomputing and storing all of the multiplies of the divisor to the limit of the base number, whereby a particular multiple of the divisor may be generated by a table look-up procedure.

5. The apparatus defined in claim 4, including:

means for storing predetermined values of trial quotient digits whereby a trial quotient digit for a particular combination of leading digits of the dividend and divisor, respectively, may be generated by a table lookup procedure.

6. The apparatus defined in claim 5, including:

means for substituting the positive remaining difference for the normalized dividend and repeating the division until a predetermined number of quotient digits is obtained.

* * * * *